United States Patent
Pfaffelhuber et al.

[11] Patent Number: 6,153,286
[45] Date of Patent: Nov. 28, 2000

[54] SOUND ABSORBENT COMPONENT AND PROCESS FOR MANUFACTURE OF THE SAME

[75] Inventors: Klaus Pfaffelhuber, Günzburg; Gerhard Köck, Walterhausen; Stefan Lahner, Krumbach, all of Germany

[73] Assignee: Faist Automotive GmbH & Co. KG, Krumbach, Germany

[21] Appl. No.: 09/259,369

[22] Filed: Feb. 26, 1999

Related U.S. Application Data

[63] Continuation of application No. PCT/EP97/03540, Jul. 4, 1997.

[51] Int. Cl.[7] ............................... B32B 1/00; E04B 1/82; B21D 22/00
[52] U.S. Cl. ..................... 428/178; 428/116; 428/180; 428/181; 264/271.1; 156/197; 156/212; 181/288; 181/290; 181/293; 72/347
[58] Field of Search ..................... 428/116, 117, 428/178, 180, 181, 188, 130, 304.4; 181/284, 288, 293, 290; 264/241, 271.1, 285, 292; 29/455.1; 156/197, 166, 212, 213; 228/165; 72/347, 356

[56] References Cited

U.S. PATENT DOCUMENTS

| | | | |
|---|---|---|---|
| 1,154,254 | 9/1915 | Lachman | 428/178 |
| 1,996,490 | 4/1935 | Romanoff | 428/181 |
| 3,507,634 | 4/1970 | O'Driscoll | 428/178 |
| 4,304,821 | 12/1981 | Hayase et al. | 428/178 |
| 4,555,433 | 11/1985 | Jablanka et al. | 428/180 |
| 4,705,139 | 11/1987 | Gahlau | 181/290 |

FOREIGN PATENT DOCUMENTS

| | | |
|---|---|---|
| 0214559A | 3/1987 | European Pat. Off. . |
| 0683480 | 11/1995 | European Pat. Off. . |
| 0775354 | 5/1997 | European Pat. Off. . |
| 0781445 | 7/1997 | European Pat. Off. . |
| 6948849 | 4/1970 | Germany . |
| 4334984C | 1/1995 | Germany . |
| 19529440A1 | 8/1995 | Germany . |
| 19529440A | 2/1996 | Germany . |
| 9414943 | 2/1996 | Germany . |
| WO9605591 | 2/1996 | WIPO . |
| WO9608812 | 3/1996 | WIPO . |

OTHER PUBLICATIONS

Form PCT/ISA/210 (patent family annex), International Search Report, International Application PCT/EP97/03540, 1 page.

Petition of Jul. 28, 1998 to the European Patent Office as the International Examination Authorities, PCT/EP97/03540, German and partial English translation, 8 pages.

International Search Report, dated Oct. 28, 1997, including annexed thereto International Preliminary Examination Report (PCT Article 36 and Rule 70), 6 pages.

*Primary Examiner*—Donald Loney
*Attorney, Agent, or Firm*—Hopgood, Calimafde, Kalil & Judlowe, LLP

[57] ABSTRACT

A sound-absorbing cellular component is produced in multiple-chamber array, using a grid of spaced elongate rods, and by engaging to the rods of said grid a foil of deformable sheet material which is then drawn by deformation through spaces between rods, to thereby define adjacent partition walls of adjacent chambers. Various embodiments are described, involving retention and/or removal of the rods, and/or involving application of one or more insulating or finishing materials continuously over outwardly facing bottoms of the chambers of the array.

27 Claims, 4 Drawing Sheets

SOUND ABSORBENT COMPONENT AND PROCESS FOR MANUFACTURE OF THE SAME

This application is a continuation of Ser. No. PCT/EP97/03540 filed Jul. 4, 1997.

BACKGROUND OF THE INVENTION

The invention relates to a process for the production of a sound absorbent component as well as to a sound absorbent component wherein chambers present thin side walls and form acoustic resonators.

In the known process (DE-A-195 29 440), a foil is deformed to have cup or chamber-like cavities in such manner that there remain spacings between the side walls of adjacent chambers.

In another "sound absorber", it has already been known (EP 0 683 480 A1) to form cylinder-shaped, cup-like cavities in a deep-drawing process from a foil and to cover them with a liquid-tight cover layer on the open side facing the incident sound so that no foreign matter nor impurities may accumulate in the resonator chambers. It is also known to form the chambers from flexible tubes being attached to the underside of such a carrier layer. Such sound absorbers have proven their functional worth, however, the production thereof is relatively expensive.

Moreover, it is also known (DE 43 34 984 C1, DE-U 69 48 849 and EP 0 214 559 A3) to line chambers formed of plastic foam with thin foils in order to protect the porous chamber side walls from impurities. Production is relatively expensive in this case too.

BRIEF STATEMENT OF THE INVENTION

It is the object underlying the invention to produce sound-absorbing components of this type even more easily and nevertheless provide for a good sound-absorbing or, respectively, sound-damping effect.

In contrast to the above-cited prior art, the thin side walls of adjacent chambers are not disposed at a larger spacing from each other, but they are, in accordance with the invention, placed closely next to each other or preferably integrated to form a partition respectively assigned to more than one chamber. Therefore the chambers form a compartment-like chamber system together with the partitions wherein the chambers forming kind of a duct are delimited from each other by the respective partitions only, i.e., they extend immediately next to each other.

According to a special configuration of the invention, the chambers are disposed adjacent to and behind each other such that they form sort of a honeycomb system in the chamber plane although the respective chamber cross-section is, unlike for bee honeycombs, not hexagonal, but quadrangular, more particularly in the shape of a rectangle and a square, above all.

The functional advantage consists in that the available space is filled with the optimum number of chambers since the chambers are separated from each other by the thin partitions only which comprise a foil layer thickness or, respectively, a double foil layer thickness preferably in the order of 0.1–5 mm.

Although the component according the invention may be cast or, respectively, transfer molded in one piece, where the use of thermosetting or, even better, thermoplastic plastics offers itself, a deep-drawing process is used for the production according to a special development of the invention. In the process, a deep-drawing tool, which is more particularly grid-like, is placed on a foil, providing for that the grid rods draw the respective foil portions, upon which they rest, so far from the foil plane using heat and pressure or, respectively, that the foil is drawn around and away from the grid rods so far that the connecting portions between the portions, upon which the rods rest, and the upwardly drawn foil portions form the partitions; in the process, the foil portions are placed next to each other as the side walls of adjacent chambers; they may even fuse to each other. In one particular configuration of the invention, the grid is formed to be three-dimensional.

In addition to the above-mentioned functional advantages and the advantages in process technology described here, expenditure for material is low and the chamber bottoms provide for that no impurities nor humidity may penetrate into the chambers while additional cover foils are not needed. The bottoms formed of foil are so thin that they act like membranes and thus let sound pass into the chambers from outside. Therein, a spring mass system is formed in connection with the partitions and optionally a carrier, upon which the free partition ends are supported, which damps certain frequencies of the sound energy. By selecting the material for the component as well as the size of the chambers and the material thickness for the partitions and bottoms, certain frequency ranges may be damped especially strongly or it becomes possible to damp a relatively broad frequency spectrum of the sound energy. If a specific foil material has proven to be favorable for the bottoms and partitions of the component chambers, it is merely necessary to dimension the spacings between the grid rods used for deep-drawing and the extent by which they deep-draw the respective foil portions from the foil plane, more particularly perpendicularly to the foil plane, in correspondence with the desired frequencies.

The rods used for deep-drawing may be removed from the partition ends, which are thickened in particular, by undoing said ends. However, it is recommended for some applications to use so-called "lost grids" as deep-drawing tools so the rods remain in the partition ends. This results in an improved stability of the entire component, which is for instance required for an application as a bonnet absorber, i.e., a sound-deadening lining for an automobile hood. In this case it is recommended that the rod material consist of the same or similar material as the foil or plate from which the deep-drawing process originates. The invention is not limited to the use of thin foils, but plates being thicker than foils may be used too.

In case the sound-absorbing or, respectively, damping effect is to be improved even more for special cases, it is recommended according to a further development of the invention to put the chamber bottoms on sound-absorbing layers like damping webs, in particular. Further, the foil might be put on an aluminum ribbon coated with polypropylene, for instance, which acts as a heat shield. In order to reinforce the sound-absorbing component, it may also be useful to attach reinforcing members like, for instance, reinforcing grids on the bottoms of the chambers and optionally insert the reinforcing grids between the bottoms and the additional sound-absorbing and/or heat-deflecting layer. Such reinforcing members may be formed by a fabric and it is recommended to use a reinforcing mat, for instance, if thermoplastically bonded fibers are used for the reinforcing members.

BRIEF DESCRIPTION OF THE DRAWINGS

In the following, preferred embodiments of the invention will be explained in detail in connection with the accompanying drawings, in which.

DETAILED DESCRIPTION

Figure 1:
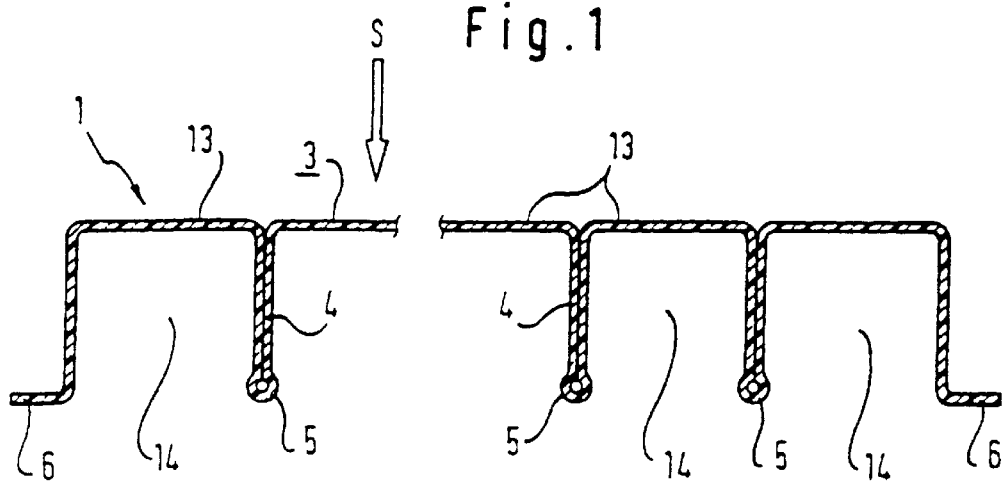
FIG. 1 is a schematic partial cross-section through a sound-absorbing component 1 according to the invention.

According to FIG. 1, component 1 is formed of a plurality of chambers 14 which are disposed adjacent to and, optionally, behind each other (not represented in FIG. 1). Chambers 14 are respectively separated from each other by partitions 4. At its outer edge, component 1 is terminated by flange 6 which extends into the plane of the thickened partition ends 5 and which may serve as a fastening means for a carrier 2, as for instance, shown in FIG. 3. Bottoms 13 of chambers 14 face the incident sound; they are produced from foil 3 in a deep-drawing process just like partitions 4. The incident sound is indicated by arrows provided with the letter "S".

Figure 2:
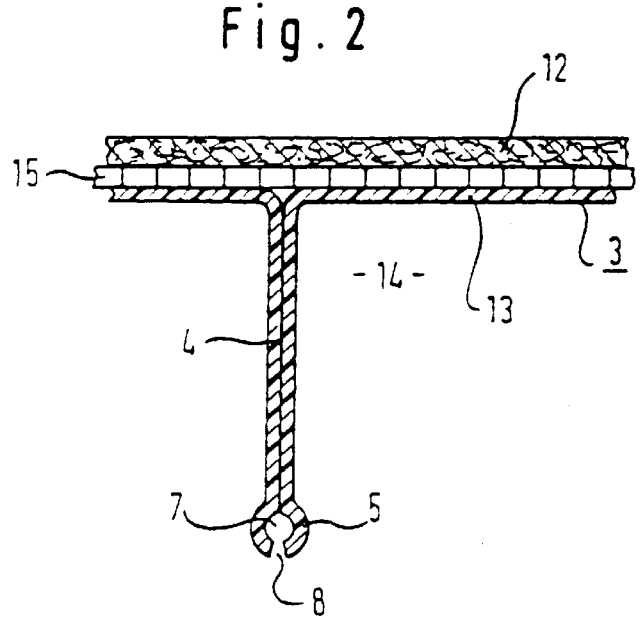
FIG. 2 is an enlarged partial section through a further embodiment of the invention.

According to FIG. 2, bottoms 13 are covered with a web 12 additionally damping sound waves on the side facing the incident sound. A reinforcing grid 15 inserted between bottoms 13 or, respectively, foil 3 and web 12, which may be thermally sealed to web 12 and foil 3. In this embodiment, the thickened partition edge 5 is cut by a slot 8 leading to the interior region 7 wherefrom rods, which are no longer shown here and form portions of a deep-drawing tool, have been removed via slot 8.

Figure 3:
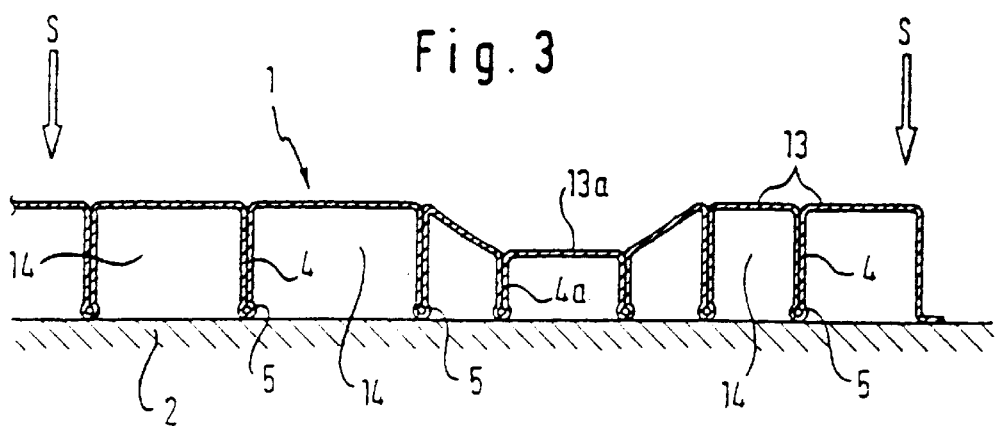
FIG. 3 is a schematic cross-section through a component according to the invention connected with a carrier 2, wherein the carrier 2 is in a single plane, and wherein the exterior side of the component (a) faces incident sound and (b) is not confined to a single plane.

In the embodiment of FIG. 3, chambers 14 do not have the same size, but chamber bottoms 13a are situated at a smaller spacing from carrier 2 than other chamber bottoms 13. The sectional width of chambers 14 is selected in different sizes so that different sound frequencies are "damped" due to the spring mass effects.

Figure 4:
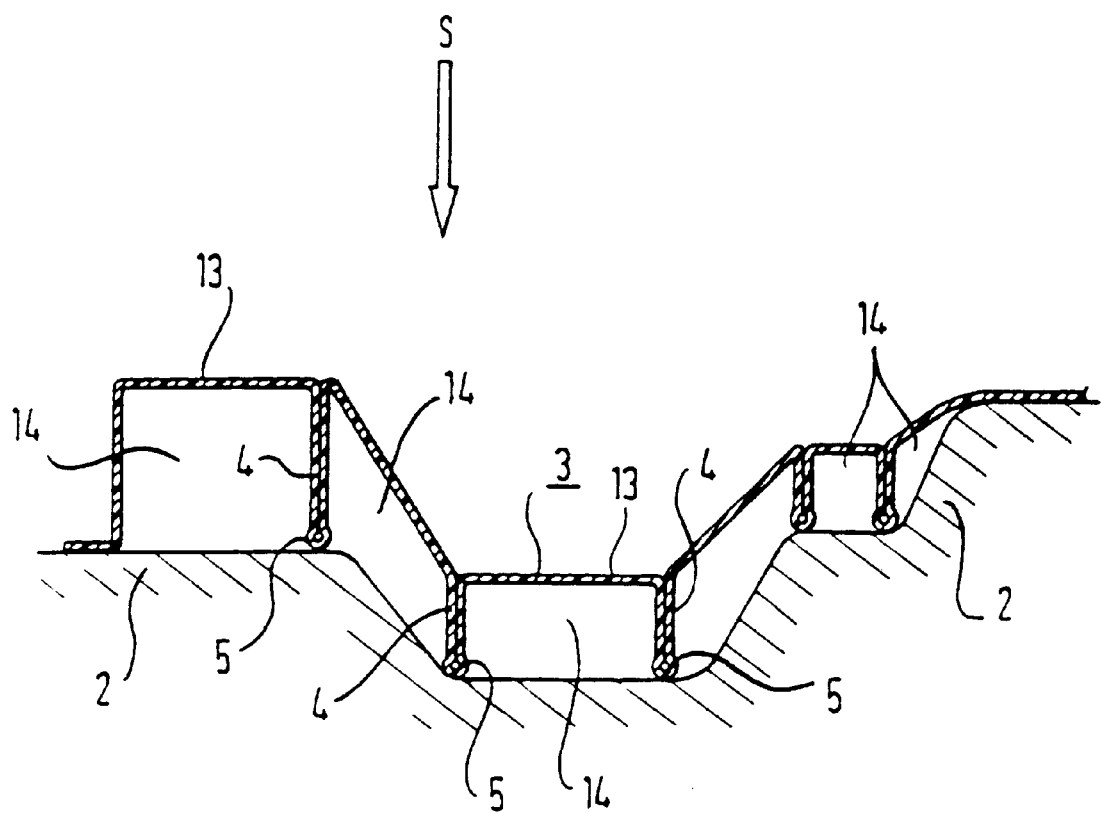
FIG. 4 is a cross-section corresponding to that of FIG. 3 wherein the carrier 2 is situated in different planes.

In the sound-absorbing component according to FIG. 4, carrier 2 is not situated in a flat plane; rather, the outer surface of carrier 2, which faces the sound absorbent component, extends in different planes which are partially inclined towards each other. The thickened partition ends 5 are supported by corresponding surface portions of carrier 2 according to FIG. 4. Partitions 4 extend between such partition edges 5 and bottoms 13 of the "membrane absorber", which face the incident sound, the chambers 14 being formed between bottoms 13, partitions 4 and the surface of carrier 2. This means that the thickened partition ends or, respectively, partition edges 5 are not situated in a flat plane, but are adapted to the outer contour of carrier 2, which is already taken account for in the production process for the component.

A particularly simple production process will be demonstrated from FIGS. 4a and 4c as follows:

According to FIG. 4a, a thin film 3 of PP (polypropylene) having a thickness of 1–5 mm is pressed against rods 9 from below, which are combined with grid rods lying perpendicularly to each other in the form of a grid. In this "initial stage" of the production process according to FIG. 4a, the foil 3 is situated in a single flat plane.

According to FIG. 4b, the heated foil 3 is subsequently drawn upwardly from these rods 9 in the direction of the arrows with rods 9 or, respectively, the grid being fixed, whereby portions of the plastically deformable foil 3 form grooves or, respectively, folds 3a in the region of the rods 9.

Figure 4A:
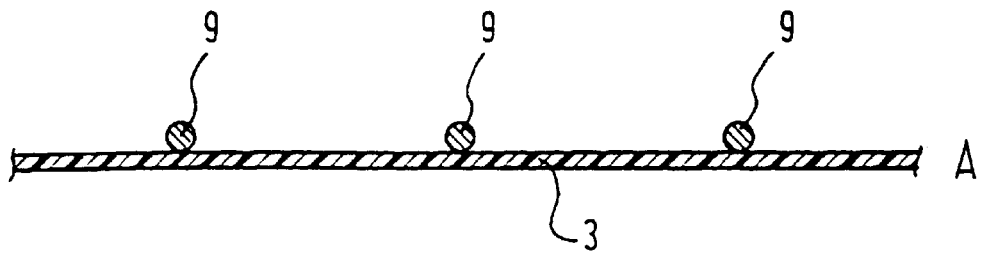
FIGS. 4a, 4b, and 4c show different deforming stages during the process for manufacture of the component according to the invention.
Figure 4B:
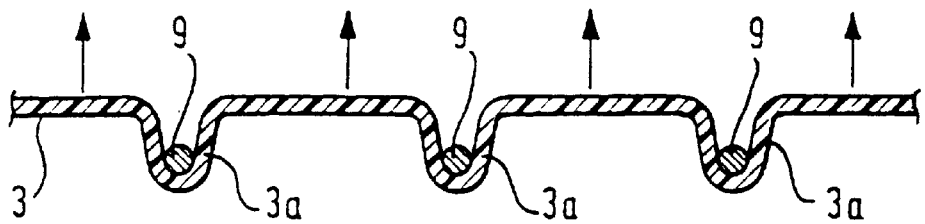
Figure 4C:
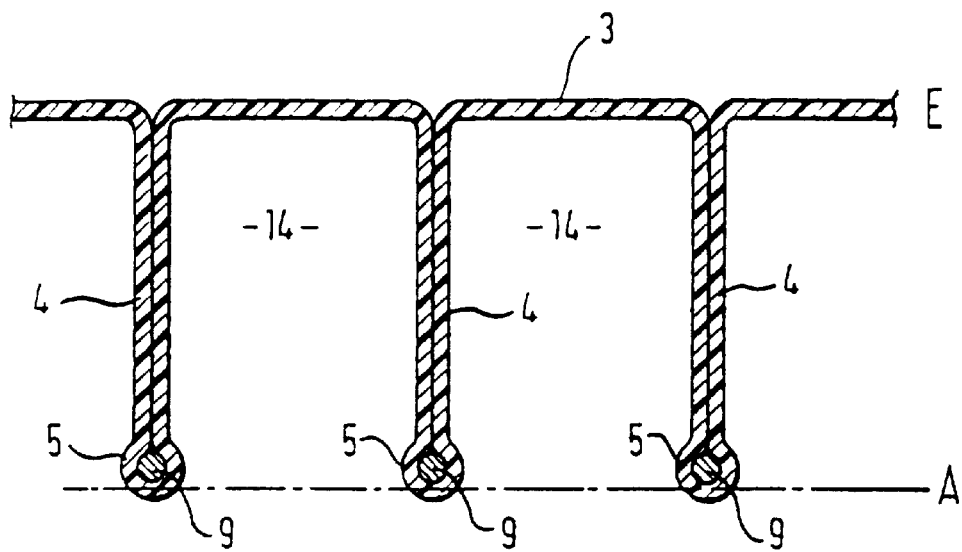

According to FIG. 4c, the final "deep-drawing stage" is schematically represented, wherein foil 3 is drawn out of the original plane A of FIG. 4a into final plane E at an offset spacing from plane A. Rods 9 are situated inside the thickened edge 5 of partitions 4 which are formed by a double layer of the foil portions drawn out of foil plane E, at right angles in this case. Folds 3a of FIG. 4b are drawn substantially farther and have been placed next to each other to form partitions 4 between chambers 14 formed thereby.

Rods 9 may remain in partition ends 5. In this embodiment, the "deep-drawing grid" formed of rods 9 is provided in the form of a "lost grid", which on the one hand renders superfluous the application of another process step, but also contributes to the reinforcement of the edge regions 5 and chamber 14.

Figure 5:
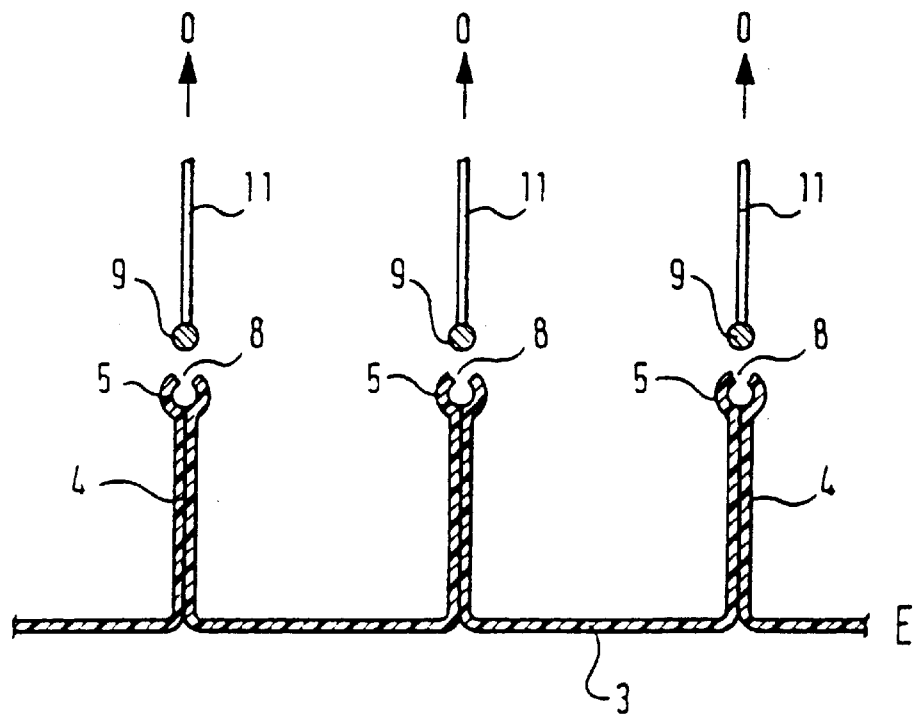
FIG. 5 is another schematic cross-section of a component according to the invention, in illustration of a further process stage.

If said reinforcements and "lost grids" are not desired, the embodiment according to FIG. 5 may also provide for that the thickened partition ends 5 are undone and the rods 9 are taken out with a tool 11. In the embodiment of FIG. 5, the foil plane E is situated below so that the tool 11 would have to carry out an upward movement in the direction of arrows O. The grid formed of rods 9 may either be cut out of partition ends 5 with a punching knife located in the counterdie of the deep-drawing machine or it may be fused out by heating of the partition edges. According to one embodiment of the production process, the foil 3 is drawn by a counterdie over the grid onto the above-mentioned sound-insulating web 12 and, together with same, onto kind of a "deep-drawing bed". Foil 3, which is held by a frame not shown here, is moved downwardly from the top over the grid towards the "deep-drawing bed". Foil portions for the formation of partitions 4 are thereby also drawn downwardly and the chambers 14 are formed simultaneously. The thickened partition edges 5 are then situated above so that, according to FIG. 5 for instance, a counterdie moves downwardly, cuts the portions of the partition ends which are situated above and penetrates up to the rods 9. When the counterdie is moved back upwardly, the grid rods 9 are drawn upwardly too and removed from component 1.

Figure 6:
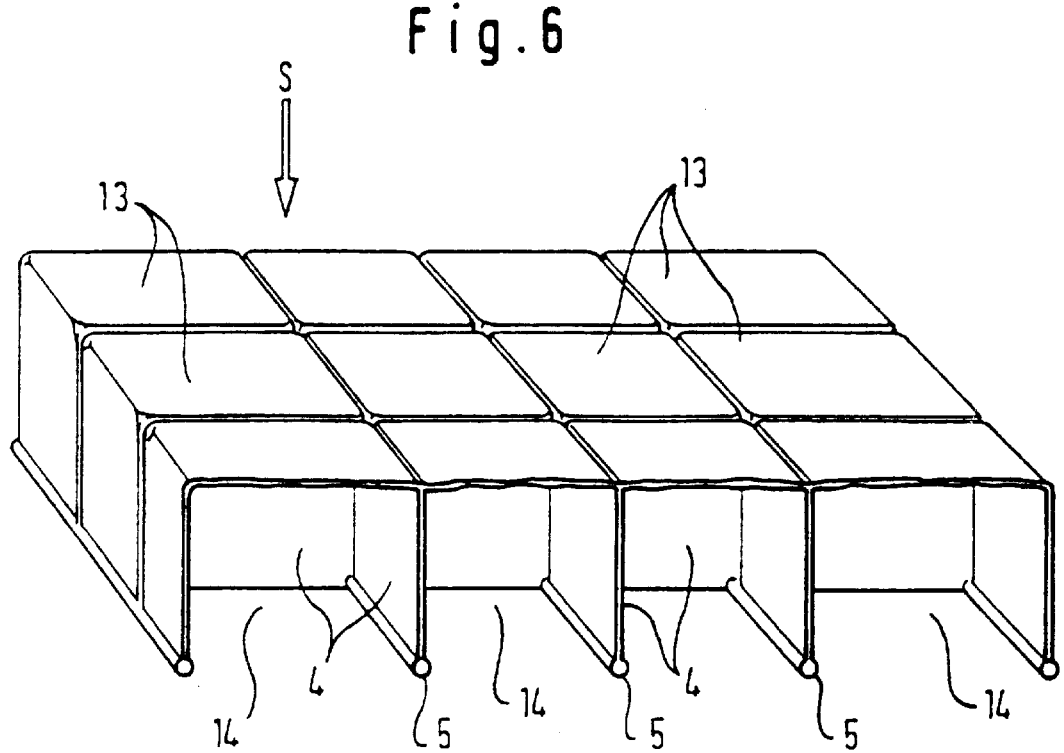
FIG. 6 is an isometric view of a cut-through portion of the component.

FIG. 6 shows a schematic oblique plan view of a component 1 composed of such a chamber system.

The material for the component is not limited to plastics nor to thermoplastic plastics. A thin aluminum foil may be used as well for configuring a corresponding chamber system by deep-drawing.

Preferred applications of the invention lie within the scope of engines, automotive engines in particular. Therein, the engine enclosure or the bonnet sheet (hood panel) may serve as a carrier onto which the component with the free partition ends is put and connected therewith via welding, gluing, clipping or the like.

What is claimed is:

1. A process for the production of a sound absorbent component wherein chambers (14) assembled as a compartment-like chamber system present thin sidewalls and a bottom panel to form acoustic-resonance chambers, wherein a foil (3) is deformed to form the sidewalls and the bottom wall characterized in that the foil (3) is put onto or against a structure of spaced rods (9) which structure defines a mounting plane (A) and is subsequently drawn about the rods (9) and through spaces between the rods (9), the draw being from mounting plane (A) to a final plane (E) spaced away from abutment plane (A), the deformation being such that the thin sidewalls of adjacent chambers (14) are in abutting adjacency to form thickened partitions (4) of the sound absorbent component.

2. Process according to claim 1, wherein the partitions at the mounting plane (A) are in rounded edge-wrap of a rod (9) between adjacent chambers (14) to define thickened partition ends (5), and wherein the rounded edge wrap is severed and the rods (9) are detached from the thickened partition ends (5) after foil-drawing.

3. Process according to claim 1, wherein the partitions at the mounting plane (A) are in rounded edge-wrap of a rod (9) between adjacent chambers to define thickened partition ends (5), the rods (9) remaining in the thickened partition ends (5) after foil-drawing.

4. Process according to any of the preceding claims, characterized in that a foil (3) has a thickness between 0.1 and 5 mm.

5. As an article of manufacture, a unitary sound absorbent component adapted to be mounted to the inner surface of an automobile or the like body or housing panel, said component comprising a distributed array of acoustic-resonance chambers having sidewalls integrally united with closed-end bottom panels, wherein adjacent closed-end bottom panels are in a plane (E) of offset from a mounting plane (A) at which the acoustic-resonance chambers are adapted to be open to the inner surface of the body or housing panel, said array of acoustic-resonance chambers being the product of deep-drawing a single foil (3) through a grid structure of spaced elongate rods at the mounting plane (A), wherein in the course of deep-drawing, the foil (3) establishes an end wrap around individual rods of the grid structure, the foil-drawing being through spaces defined by and between rods of the grid structure and extending to the plane (E) of offset from mounting plane (A), with sidewall expansion in adjacent chambers to assure abutment of adjacent sidewalls of adjacent chambers, thereby establishing bottom panels of adjacent chambers at offset plane (E) and adjacent sidewall panels of adjacent chambers in abutting relation to form effectively thickened sidewall formations between adjacent chambers.

6. The article of claim 5, in which the foil (3) is relatively thin, such that the bottom panel of each acoustically resonant chamber serves as an independent, compliantly yieldable membrane that is peripherally supported by the effectively thickened sidewall formations.

7. The article of claim 5, in which the foil (3) is relatively thin, such that, for acoustic-energy having a component of incidence on a plurality of bottom panels of adjacent acoustic-resonance chambers at the offset plane (E), each of the involved bottom panels of said chambers is a compliantly yieldable and relatively thin membrane that is independently supported by peripherally continuous connection to thickened sidewall formations that are relatively stiffly compliant.

8. The article of claim 5, in which adjacent sidewall panels of adjacent chambers are secured to each other to form the effectively thickened sidewall formations between adjacent chambers.

9. The article of claim 5, in which the sectional area defined by and within the sidewalls of each acoustic-resonance chamber is substantially quadrilateral, in substantial match with the area of the bottom panel formed therewith at the offset plane (E).

10. The article of claim 9, in which said sectional area is different as between at least two adjacent chambers of said array.

11. The article of claim 5, in which the volume defined by and within the side walls of at least one of two adjacent chambers of said array is different from the volume defined by and within the other of said two adjacent chambers.

12. The article of claim 5, in which foil (3) is a thermoplastic sheet.

13. The article of claim 12, in which the rods of the grid structure are of the same material as that of the foil (3).

14. The article of claim 12, in which the rods of the grid structure are of metal.

15. As an article of manufacture, a sound absorbent component comprising a two-dimensionally distributed array of acoustic-resonance chambers having sidewalls which are integrally united with closed-end bottom panels wherein adjacent closed-end bottom panels are in a plane (E) offset from a mounting plane (A) at which the acoustic-resonance chambers are adapted to be open to the inner surface of a body panel to be acoustically insulated from sound incident upon said component at the offset plane (E), said sidewalls being approximately double the thickness of the bottom panels such that adjacent chambers share the relative stiffness of double-thickness sidewalls which provide the peripheral support of relatively thin and compliant bottom panels that are acoustically responsive to sound incident at the offset plane (E).

16. The article of claim 15, in which a single foil of initially uniform thickness is the material from which said bottom panels and said sidewalls are integrally formed, wherein the bottom panels are of single thickness and wherein the sidewalls are of double thickness.

17. The article of claim 16, in which each of the sidewalls incorporates a reinforcement material at least in the region of sidewall adjacency to the mounting plane (A).

18. A process for producing a sound absorbent component wherein chambers (14) assembled as a compartment-like chamber system are characterized by relatively thin sidewalls and define acoustic resonance chambers, wherein a foil (3) is deformed to form the sidewalls, and a bottom panel for each chamber, characterized in that the foil is applied to abut and cover in a mounting plane (A) a structure of spaced rods (9), and to form partitions between adjacent chambers by subsequently drawing foil (3) from the mounting plane (A) through spaces between adjacent rods to a final plane (E) spaced from plane (A), the deformation of foil (3) being such that adjacent sidewalls of adjacent chambers (14) are in abutting adjacency to define thickened partitions of the sound-absorbent component.

19. The component article of claim 5, in which the bottom panels (13, 13a) are covered outside said chambers with an additional layer (12) of sound-absorbing or sound-damping material.

20. The component article of claim 19, in which the sound-absorbing or sound-damping layer (12) consists of a web.

21. The component article of claim 19, in which the sound-absorbing or sound-damping layer (12) consists of a plastic foam.

22. The component article of claim 20, in which a reinforcing mat (15) is interposed between the bottom panels (13) and the web.

23. The component article of claim 22, in which the reinforcing mat (15) comprises thermoplastically bonded fibers.

24. The component article of claim 5, wherein the edges of the effectively thickened sidewalls are even more thickly formed for reinforcement, in proximity to the mounting plane (A).

25. The component article of claim 24, wherein reinforcement at the said edges is provided by rod components of a deep-drawing tool.

26. The component article of claim 25, wherein said tool comprises a grid of spaced rod components.

27. The component article of claim 5, in which partition ends (5) are connected to a carrier (2).

* * * * *